Figure 1:
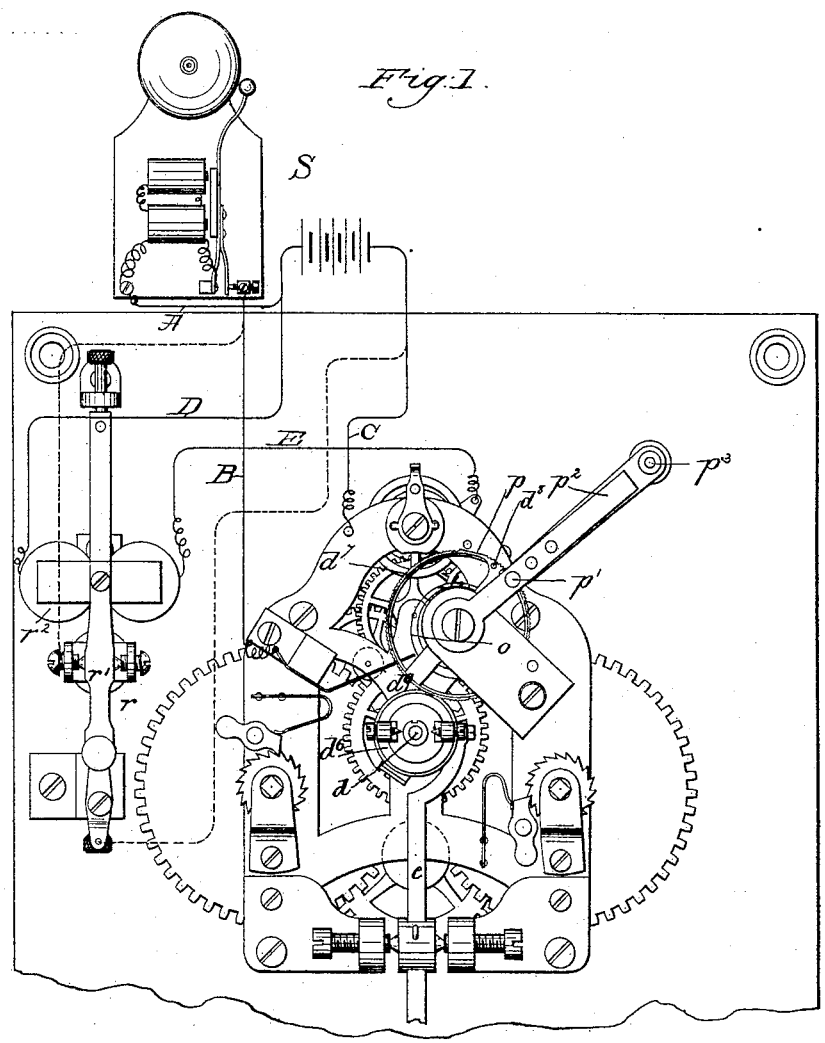

(No Model.) 3 Sheets—Sheet 1.
L. W. PENNELL.
WATCHMAN'S TIME DETECTOR.

No. 338,292. Patented Mar. 23, 1886.

Witnesses

Inventor.
Lloyd W. Pennell
by Crosby Gregory attys (No Model.) 3 Sheets—Sheet 2.

L. W. PENNELL.
WATCHMAN'S TIME DETECTOR.

No. 338,292. Patented Mar. 23, 1886.

Witnesses
Fred L. Emery.
John F. C. Brinkert.

Inventor.
Lloyd W. Pennell
by Crosby & Gregory Attys.

(No Model.) 3 Sheets—Sheet 3.

L. W. PENNELL.
WATCHMAN'S TIME DETECTOR.

No. 338,292. Patented Mar. 23, 1886.

Witnesses
F. L. Emery
John F. C. Brinkert
Fred L. Emery

Inventor
Lloyd W. Pennell
by Crosby & Gregory
attys

N. PETERS, Photo-Lithographer, Washington, D. C.

UNITED STATES PATENT OFFICE.

LLOYD W. PENNELL, OF BRAINTREE, MASSACHUSETTS, ASSIGNOR TO THE TARBOX TIME REGISTER COMPANY, OF PORTLAND, MAINE.

WATCHMAN'S TIME-DETECTOR.

SPECIFICATION forming part of Letters Patent No. 338,292, dated March 23, 1886.

Application filed April 13, 1885. Serial No. 162,102. (No model.)

*To all whom it may concern:*

Be it known that I, LLOYD W. PENNELL, of Braintree, county of Norfolk, and State of Massachusetts, have invented an Improvement in Watchmen's Detectors, of which the following description, in connection with the accompanying drawings, is a specification, like letters on the drawings representing like parts.

My invention is embodied in a watchman's detector in which a record is made of the time that the watchman visits each station.

The main object of the invention is to cause an alarm to be sounded or a signal otherwise produced at any given point in case the watchman should fail to visit the stations within a predetermined period of time.

The invention is shown in this instance as applied to a watchman's detector of the kind described in application Serial No. 162,128, in which an arm or pointer is moved by a clock over the surface of a dial, the said arm being provided with a marker normally disengaged from the dial, and moving longitudinally on the arm in proportion to the revolving or angular movement of the latter, so that the said marker moves in a spiral path over the dial. The arm is also acted upon by an electro-magnet energized by the operation of a circuit-controlling device at each side of the stations to be visited, causing the marker to be engaged with the dial, and to make a mark thereon when the magnet is thus energized.

In the present invention the clock is provided with a circuit-controlling device, one member of which is moved by the clock from a definite position or starting-point after each operation of the marker toward the other member, so that it will close the circuit at the end of a definite predetermined period of time after the last operation of the marker, being released and returned to its starting-point whenever the marker is operated, so that the predetermined interval of time will have to elapse after the last operation of the marker before the circuit will be closed, and the said circuit will not be closed as long as the watchman continues to visit each station before the predetermined period has elapsed since he visited the last station. The circuit controlled by the device thus operated by the clock may be extended to any desired point, and may include any suitable kind of signaling device which will thus be operated in case the watchman fails to visit the stations within the proper intervals of time. Means are also provided for producing a signal or alarm in case the clock stops.

Figure 4:
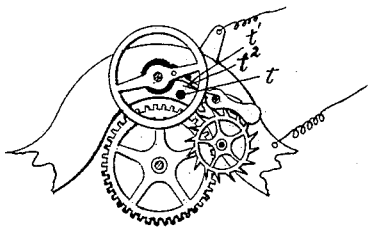
Figure 2:
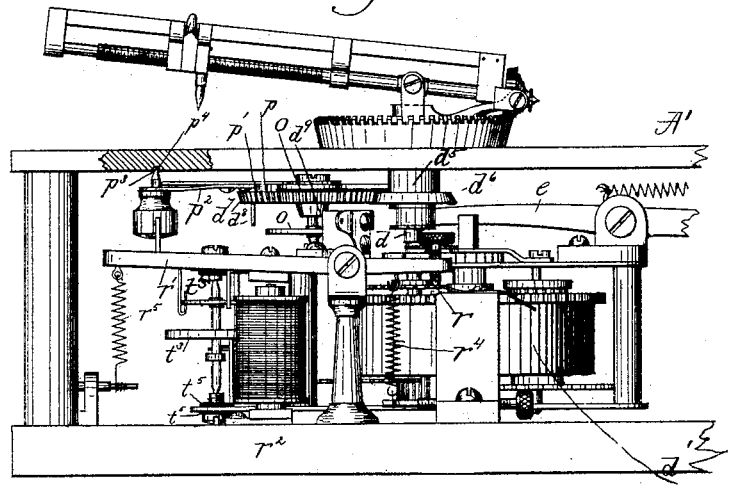
Figure 3:
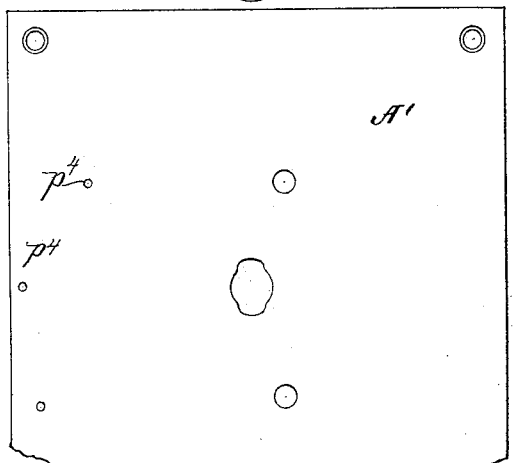
Figure 5:
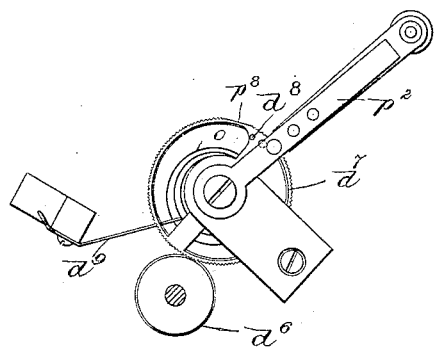
Figure 6:
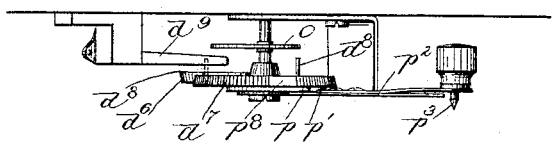

Figure 1 is a plan view of a portion of a watchman's detector apparatus embodying this invention; Fig. 2, a side elevation thereof; Fig. 3, an under side view of a portion of the frame-work of the apparatus, and Fig. 4 a detail of the devices for indicating the stopping of the clock. Fig. 5 is a detail of the circuit-closing device $d^8 d^9$, and Fig. 6 is a view of Fig. 5 inverted.

The main frame-plate A′, supporting the dial, the clock $d'$, and arbor $d$ thereof, which arbor carries the revolving arm provided with the marking device, may be of any suitable construction, being shown as the same as in the application hereinbefore referred to, the said arbor $d$ being provided with a sleeve, $d^5$, which rotates therewith, but is free to move longitudinally thereon, and in the said longitudinal movement causes the marker to engage the dial for making the record thereon, the said sleeve being actuated by the armature-lever $e$ of an electro-magnet. (Not herein shown.) The sleeve $d^5$ is provided with a friction-disk, $d^6$, engaging the periphery of a wheel, $d^7$, provided with a projection, $d^8$, constituting one member on a circuit-closer, the other member of which consists of a spring, $d^9$, insulated from the frame-work of the clock and extending across the path which the projection $d^8$ traverses in the rotary movement of the wheel $d^7$, so that if the said wheel $d^7$ continues rotating a sufficient length of time the projection $d^8$ will come in contact with spring $d^9$, closing a circuit, A B C, Fig. 1, the terminals of which are connected with the said spring and clock-frame, respectively. The wheel $d^7$ has connected with it a spring, $o$, tending to turn it in the opposite direction to that in which it is turned by the disk $d^6$ in the movement of the clock, and whenever the disk $d^6$ is disengaged from the wheel $d^7$ by movement of the armature-lever pulling the sleeve $d^5$ downward on arbor $d$, as described in the other application, the wheel $d^7$ is turned backward by the spring $o$ until arrested by a stop-projection, $p$, on the said wheel, engaging a stop, $p'$, on an arm, $p^2$, movable about the axis of the wheel $d^7$, and provided with a locking-projection, $p^3$, which will engage any desired one of a series of recesses, $p^4$, in the under side of the plate A', (see Fig. 3,) being retained in the recess by the elasticity of the arm $p^2$. Thus whenever a record is made on the dial by the downward movement of the sleeve $d^5$, the wheel $d^7$ is turned back until arrested by the stop $p$, in the position which forms its starting-point, from which it begins to move after the record is thus made on the dial, so that a definite interval of time will have to elapse from the making of each record before the circuit is closed at $d^8$ $d^9$, the length of the interval depending upon the position of the arm $p^2$, which may be set for any desired interval—such as five, ten, or fifteen minutes—according to the frequency with which it is intended that the watchman shall visit the different stations. The periphery of the wheel $d^7$ is slightly serrated, so as to be rotated by the disk $d^6$ with certainty, the said disk being of rubber or yielding material, and a portion of the wheel $d^7$ is made smooth and of slightly smaller diameter, as shown at $p^8$, Fig. 1, this part being so arranged as to reach the surface of the disk $d^6$ when the projection $d^8$ comes in contact with the spring $d^9$, so that in the further rotation of the disk $d^6$ the wheel $d^7$ is not turned, but is held with the projection $d^8$ bearing against the spring $d^9$, and thus retaining the circuit A B C, of which the spring and pin are the terminals, closed until the recording device or sleeve $d^5$ is again operated. As the circuit-closer $d^8$ $d^9$ would fail to operate if the clock $d'$ should stop running before the pin $d^8$ reached the spring $d^9$, it is desirable to indicate such failure of the clock at the place where the signal $s$, controlled by the circuit-closer $d^8$ $d^9$, is situated, either by the same or by different signaling-instruments. This result may be effected by a circuit-closer, $r$, one member of which consists of or is carried by the armature-lever $r'$ of an electro-magnet, $r^2$, in a short circuit represented by D E C, (see Fig. 1,) one terminal of which is connected with the frame of the clock, and the other terminal being connected with a contact-spring, $t$, (see Fig. 4,) placed in position to be engaged by a spring, $t'$, carried by the escapement-lever $t^2$ of the clock, the balance or governing device $t^3$ of which (see Fig. 2) is insulated from the remainder of the clock-frame by means of bushings $t^5$ around its pivots, or, if desired, the said magnet may be in a local circuit having a local battery. Thus at each movement of the escapement-lever, produced by a complete to-and-fro oscillation of the balance $t^3$, the circuit of the magnet $r^2$, in either of the above-mentioned cases, is closed and the said magnet energized; but if the clock should stop the balance would come to rest with the escapement-lever in an intermediate position, and the circuit of the magnet $r^2$ be left open between the contact-pieces $t$ $t'$.

The armature-lever $r'$ is provided with a retractor, $r^4$, and is connected with a retarding device, $r^5$, which may consist of a spring slightly weaker than the retractor $r^4$, the said spring operating to retard the movement of the armature $r'$, so that the points of the circuit-closer $r$ will not be brought in contact by the action of the retractor $r^4$ during the interval between the successive attractive impulses of the magnet $r^2$ so long as the clock remains running; but if the clock ceases running the magnet $r^2$ will be demagnetized, and after an interval of a few seconds the retractor $r^4$, being stronger than the spring $r^5$, will cause the circuit-closer $r$ to be closed, and the alarm or signal on the circuit therewith, which may be the same or a different one from the one controlled by the circuit-closer $d^8$ $d^9$, will be set in operation.

The herein-described apparatus not only causes a record to be kept of the movements of the watchman, but also gives notice at any desired place within a short period of time if the watchman for any reason is failing to properly attend to his duty, so that assistance may be sent in case the watchman has been attacked or in any way disabled.

It is obvious that the circuit A B C containing the alarm may be normally closed and the members $d^8$ $d^9$ or the armature-lever $r'$ operate to open it, and thus cause an alarm to be sounded.

In Fig. 6 the projection $d^8$, in full lines, indicates the position it occupies with relation to the spring $d^9$ after each record has been made, while $d^8$, in dotted lines, shows its position after the lapse of the predetermined time, the said projection $d^8$ bearing against the spring $d^9$ and closing the circuit A B C, as already specified, the non-serrated part of the periphery of the wheel $d^7$ being shown at $p^8$.

I claim—

1. In a watchman's detector apparatus, the clock and its recording device or marker and an electro-magnet in circuit with different or distant stations to be visited by the watchman, combined with a circuit-controlling device operated by the clock, one member of the said device being moved toward the other by the clock from a predetermined starting-point after each operation of the recording device, substantially as described.

2. A marking device and a clock to move it to indicate the time at which the marking device is operated, combined with a circuit-controlling device moved by the said clock and rendered effective upon the circuit by the operation of the marking device only at predetermined intervals of time measured by the clock, substantially as described.

3. The clock and its recording device or marker and an electro-magnet in circuit with different or distant stations to be visited by the watchman, and a circuit-controlling device, one member of which is engaged and moved by the clock while the marker is not being operated to produce a record, but is disengaged whenever the marker is so operated, combined with a retracting-spring which moves the said member backward, or in the opposite direction when disengaged, and a stop which limits the said backward movement and constitutes the starting-point from which the member of the circuit-controlling device begins its movement after each record has been made, substantially as described.

4. The clock and its recording device or marker and an electro-magnet in circuit with different or distant stations to be visited by the watchman, and a circuit-controlling device, a member of which is engaged and moved by the clock immediately after each recording operation of the marker, combined with a retractor for the circuit-controlling device, a movable stop limiting its movement under the influence of the retractor when disengaged by the clock after a record is made, and means for holding the said stop in any desired position for the purpose of determining the interval of time that must elapse after a record is made before the circuit-controlling device will cause a change in the circuit controlled by it, substantially as described.

5. A clock having an arbor provided with a friction-disk, combined with a wheel engaged by said disk, forming part of a circuit-controlling device, the said wheel having a portion of its periphery reduced or made smooth permitting it to cease moving when it has operated the circuit-controlling device to produce a change in the circuit controlled by it, substantially as described.

6. A clock or time-train, an electric-circuit-controlling mechanism operated by it while the clock or train is running, and interposed mechanism, substantially as set forth, rendered operative upon the stopping of the clock to cause the operation of an alarm or signal placed in said circuit, substantially as described.

7. A clock or time-train and circuit-closer, one member of which is connected with a portion of the escapement or governing mechanism of the clock, the said circuit-closer being closed at each vibration of the governing device, combined with an electro-magnet in circuit therewith, and its armature-lever and retarding device, whereby the said lever is prevented from making a complete retractive movement between the successive attractive impulses of the magnet while they recur with the proper or normal frequency, substantially as described.

In testimony whereof I have signed my name to this specification in the presence of two subscribing witnesses.

LLOYD W. PENNELL.

Witnesses:
GEO. W. GREGORY,
B. J. NOYES.